(12) United States Patent
Cui et al.

(10) Patent No.: US 10,888,892 B2
(45) Date of Patent: Jan. 12, 2021

(54) PROTECTING HOLE IN COMPONENT DURING COATING PROCESS USING PLUG WITH WATER SOLUBLE LAYER

(71) Applicant: General Electric Company, Schenectady, NY (US)

(72) Inventors: Yan Cui, Greer, SC (US); Srikanth Chandrudu Kottilingam, Greenville, SC (US); Jonathan Matthew Lomas, Simpsonville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 237 days.

(21) Appl. No.: 16/110,569

(22) Filed: Aug. 23, 2018

(65) Prior Publication Data
US 2020/0061662 A1    Feb. 27, 2020

(51) Int. Cl.
| | | |
|---|---|---|
| *B05B 12/26* | (2018.01) | |
| *B05C 21/00* | (2006.01) | |
| *B05C 3/20* | (2006.01) | |
| *B05D 1/32* | (2006.01) | |
| *B05D 1/18* | (2006.01) | |

(52) U.S. Cl.
CPC ............ *B05C 3/20* (2013.01); *B05D 1/18* (2013.01); *B05D 1/32* (2013.01)

(58) Field of Classification Search
None
See application file for complete search history.

(56) References Cited

U.S. PATENT DOCUMENTS

| | | | |
|---|---|---|---|
| 6,024,787 A | 2/2000 | Lee | |
| 9,862,046 B2 | 1/2018 | Cui et al. | |
| 2004/0060964 A1* | 4/2004 | Kottilingam | F01D 5/187 |
| | | | 228/112.1 |
| 2013/0302522 A1* | 11/2013 | Eminoglu | F01D 5/288 |
| | | | 427/259 |
| 2014/0186534 A1* | 7/2014 | Wu | C25D 11/022 |
| | | | 427/300 |
| 2015/0079288 A1* | 3/2015 | Sordelet | B05B 12/26 |
| | | | 427/287 |
| 2017/0101539 A1* | 4/2017 | Pan | B05D 3/002 |
| 2017/0165770 A1* | 6/2017 | Cui | B23K 1/0018 |
| 2020/0248813 A1* | 8/2020 | Carlsson Bohm | B05B 12/26 |

FOREIGN PATENT DOCUMENTS

WO   WO-2016077071 A2 *   5/2016   ............... B64F 5/40

OTHER PUBLICATIONS

Jiang, Weiguo et al., "Preparation and Properties of a Novel Water Soluble Core Material," Science Direct, 2010, p. 270-275, vol. 26, 3.

* cited by examiner

*Primary Examiner* — Cachet I Proctor
(74) *Attorney, Agent, or Firm* — Hoffman Warnick LLC (57) ABSTRACT

A method of protecting a hole in a component during a coating process is disclosed. The method includes: placing a plug in the hole, the plug including a water insoluble core and a water soluble layer surrounding at least a portion of an outer surface of the metal core. A coating is applied over the plug and at least a portion of the component. The component is immersed in water to dissolve the water soluble layer, allowing removal of the water insoluble core. Removal of the coating from over the hole and the water insoluble core from within the hole may follow.

20 Claims, 5 Drawing Sheets

PROTECTING HOLE IN COMPONENT DURING COATING PROCESS USING PLUG WITH WATER SOLUBLE LAYER

BACKGROUND OF THE INVENTION

The disclosure relates generally to coating components, and more particularly, to a method of protecting a hole in a component during a coating process using a plug with a water soluble layer on a water insoluble core.

Industrial machines such as gas turbine components oftentimes include cooling holes in the wall of the components to increase the material capability. The cooling holes fluidly communicate with cooling chambers in the component that deliver a coolant through the cooling hole and to the outer surface of the component. Components, such as gas turbine bucket and nozzles, are typically coated with a bond coating and/or a thermal barrier coating (TBC), either locally or over an entire surface thereof, for thermal insulation and protection from oxidization.

During the original fabrication of a component, the coating(s) are usually applied over the component first, and then the cooling holes are drilled directly through the coating(s) and the wall thickness of the component to reach a cooling chamber in the component. Alternatively, in a casting process, disposable plugs can be put in place in a casting mold to create the cooling holes. For example, water soluble ceramic core plugs have been used during casting to create cooling holes.

During servicing of the component, e.g., after some time of use, the coating(s) may need to be repaired or replaced. In this case, the cooling holes are already in place. If the cooling holes are blocked during re-coating, it may decrease the effectiveness of the cooling holes and the component. Current cooling hole repair technology includes applying masking epoxies to fill the cooling holes before re-coating. The masking epoxies must be cleared from the cooling holes after the re-coating process. The application of, and removal of, the masking epoxies is time and labor intensive, and expensive. The process also has the potential to unacceptably enlarge the cooling holes.

BRIEF DESCRIPTION OF THE INVENTION

A first aspect of the disclosure provides a plug for retaining a hole in a component during a coating process, the plug comprising: a water insoluble core; and a water soluble layer surrounding at least a portion of an outer surface of the water insoluble core, the water soluble layer engaging an internal surface of the hole during the coating process.

A second aspect of the disclosure provides a method of protecting a hole in a component during a coating process, the method comprising: placing a plug in the hole, the plug including a water insoluble core and a water soluble layer surrounding at least a portion of an outer surface of the metal core; applying a coating over the plug and at least a portion of the component; immersing the component in water to dissolve the water soluble layer, allowing removal of the water insoluble core; and removing the coating from over the hole and the water insoluble core from within the hole.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
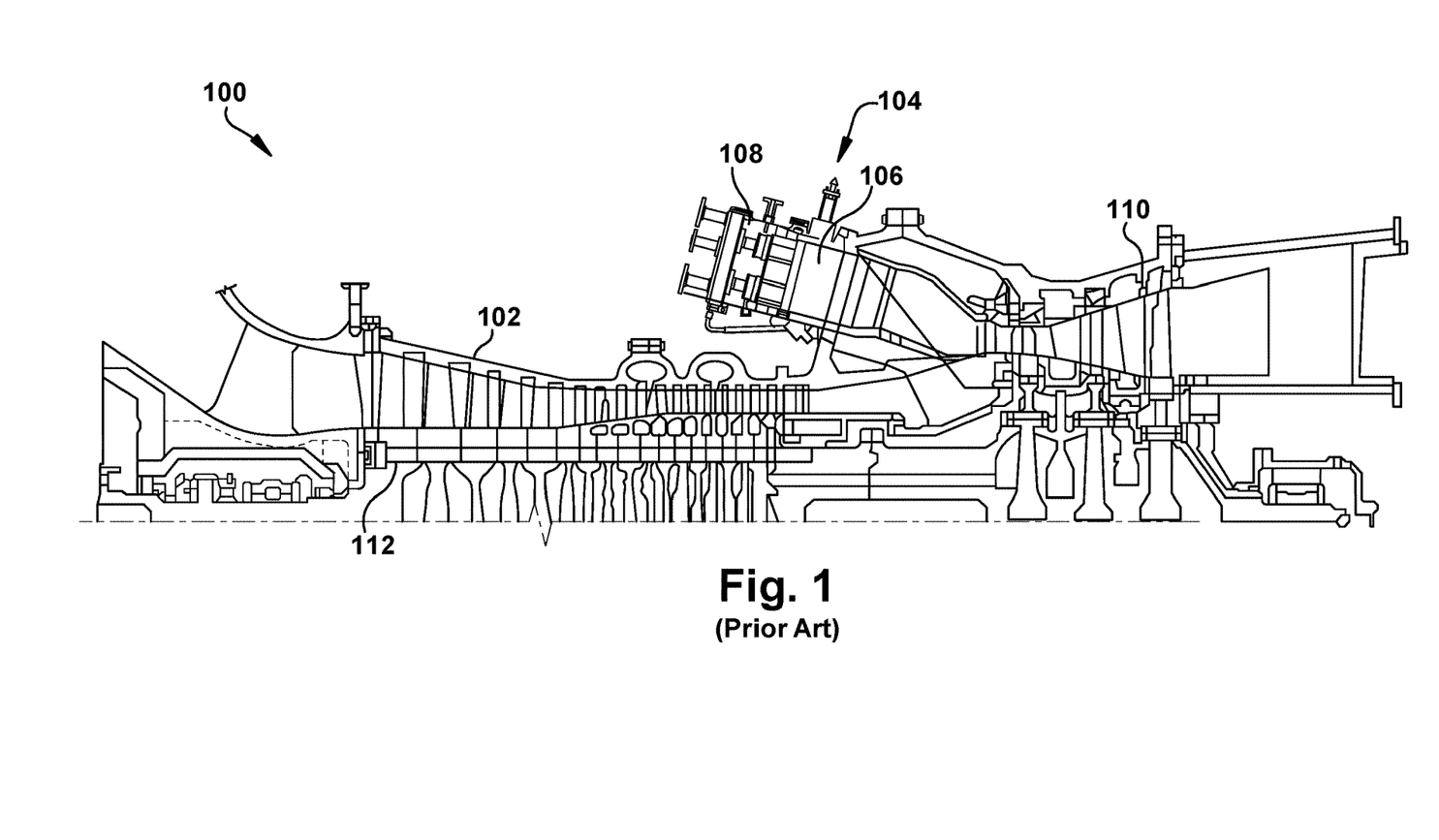
FIG. 1 shows a schematic view of an illustrative industrial machine in the form of a gas turbine system.

FIG. 1 shows a schematic illustration of an illustrative industrial machine, a component of which may be the subject of a method according to embodiments of the disclosure. In the example, the machine includes a turbomachine 100 in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine 110 and a common compressor/turbine shaft 112 (sometimes referred to as a rotor 112). In one embodiment, the combustion turbine system is a MS7001FB engine, sometimes referred to as a 7FB engine, commercially available from General Electric Company, Greenville, S.C. The present disclosure is not limited to any one particular industrial machine, nor is it limited to any particular combustion turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there is a plurality of combustors 106 and fuel nozzle assemblies 108.

Figure 2:
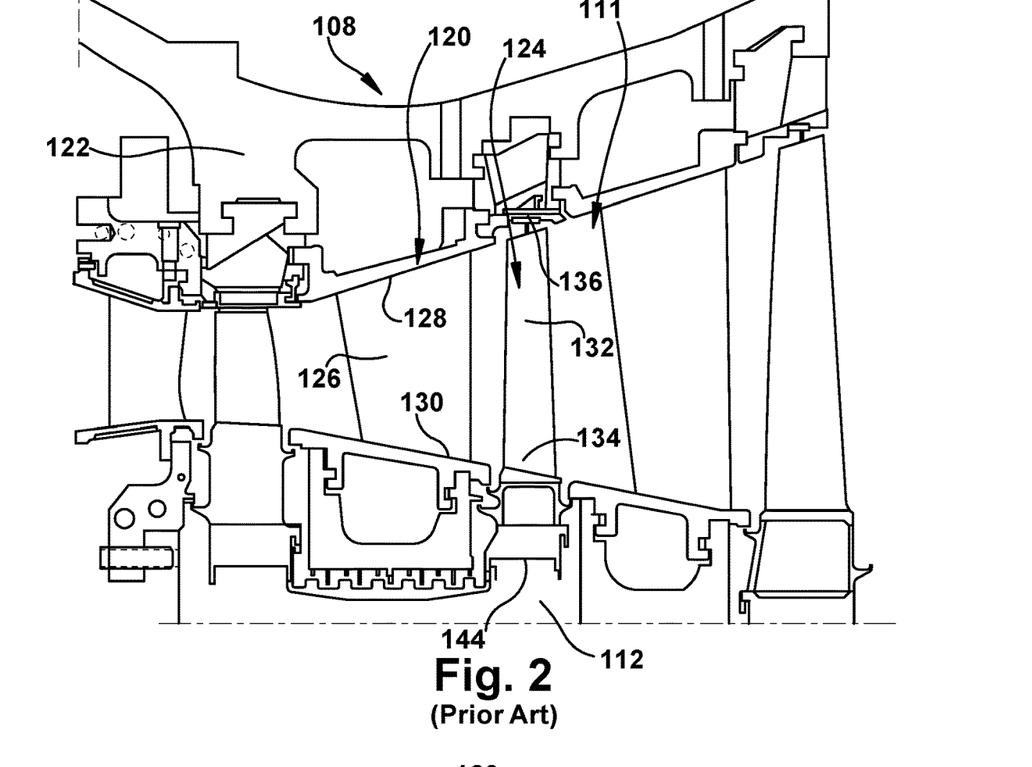
FIG. 2 shows a cross-sectional view of an illustrative gas turbine assembly that may be used with the gas turbine system in FIG. 1.

FIG. 2 shows a cross-sectional view of an illustrative turbine assembly 110 in turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row of rotating blades 124. A nozzle or vane 126 may be held in turbine assembly 110 by a radially outer platform 128 and a radially inner platform 130. Row of blades 124 in turbine assembly 110 includes rotating blades 132 coupled to rotor 112 and rotating with the rotor. Rotating blades 132 may include a radially inward platform 134 (at root of blade) coupled to rotor 112 and a radially outward tip shroud 136 (at tip of blade). As used herein, the term "blade" or "hot gas path component" shall refer collectively to stationary vanes or blades 126 and rotating blades 132, unless otherwise stated.

Figure 3:
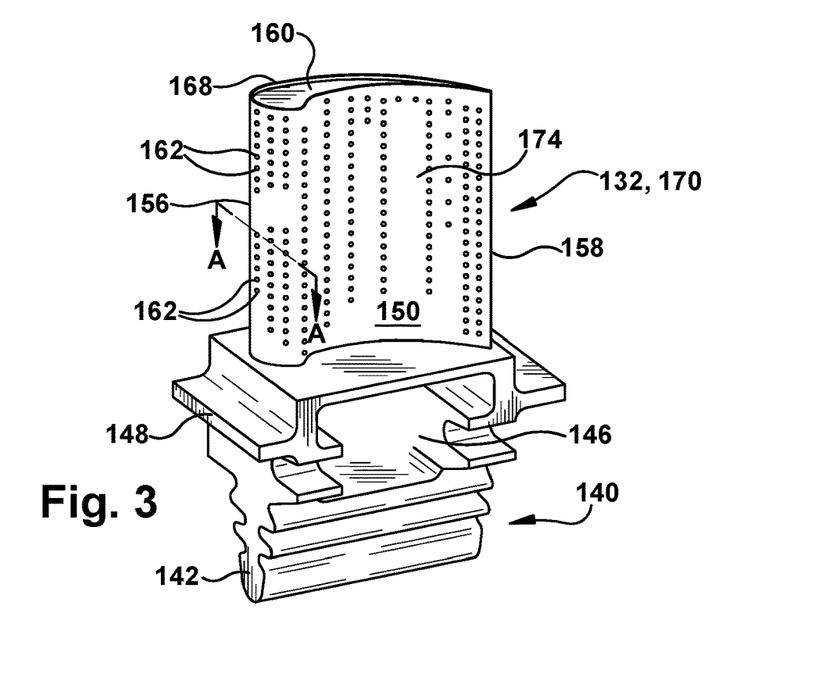
FIG. 3 shows a perspective view of an illustrative component in the form of a turbine rotor blade upon which embodiments of the present disclosure may be employed.

FIG. 3 shows an illustrative component 170 of turbomachine 100 upon which teachings of the disclosure may be employed. FIG. 3 shows a perspective view of a turbine rotor blade 132, but it is emphasized the component upon which embodiments of the disclosure may be applied may vary widely and can come from any industrial machine. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of airfoil 150 and root 140 and defines a portion of the inboard boundary of the flow path through turbine assembly 110. It will be appreciated that airfoil 150 is the active component of rotor blade 132 that intercepts the flow of working fluid and induces the rotor disc to rotate. It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Sidewalls 156 and 158 also extend in the radial direction from platform 148 to an outboard tip 160.

Figure 4:
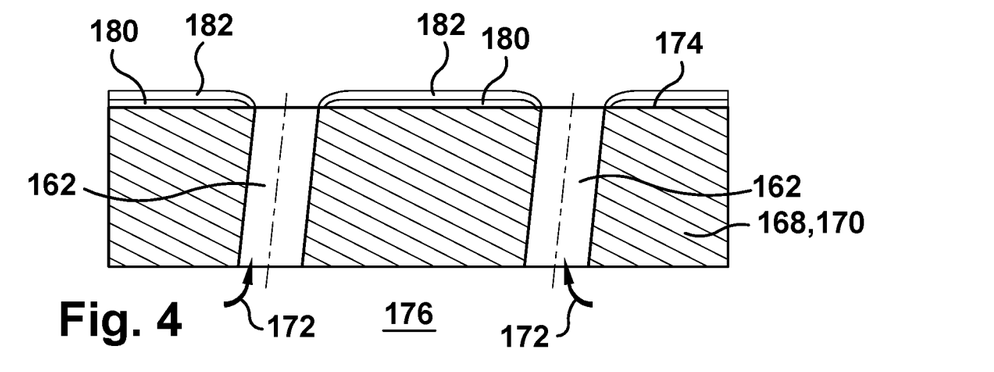
FIG. 4 shows a cross-sectional view of a pair of holes in the component along view line A-A of FIG. 3.

FIG. 4 shows an enlarged cross-sectional view of a wall 168 of component 170 and a pair of illustrative holes 162 therein along view line A-A in FIG. 3. Holes 162 will be described herein as cooling holes, but it is emphasized that teachings of the disclosure may be applied to hole(s) having different functions. As understood in the art, a coolant 172 would be delivered to cooling holes 162 to cool wall 168, component 170 and an outer surface 174 thereof. As understood in the art, component 170, e.g., airfoil 150 (FIG. 3), may include a cooling chamber 176 therein that feeds coolant 172, e.g., air, to a number of cooling holes 162 in outer surface 174 thereof. Cooling chamber 176 and cooling holes 172 may have a wide variety of paths and layouts. Component 170 may also include a bond coating 180 and a thermal barrier coating (TBC) 182 thereon (described in greater detail herein) to protect the component from the internal environment of turbomachine 100, e.g., thermal and oxidation conditions.

While embodiments of the disclosure are described relative to rotor blade 132, they are equally applicable to practically any component having cooling holes or other holes in a surface thereof, and requiring protection during a coating process, e.g., stationary vanes 126 (FIG. 2) and other components. Component 170 may include any now known or later developed metals or metal alloys, e.g., for hot gas path components. For example, component 170 may include an iron-based, cobalt-based and/or nickel-based superalloys. As used herein, "superalloy" refers to an alloy having numerous excellent physical characteristics compared to conventional alloys, such as but not limited to: high mechanical strength, high thermal creep deformation resistance, like Rene 108, CM247, Haynes alloys, Incalloy, MP98T, TMS alloys, CMSX single crystal alloys. In one embodiment, superalloys for which teachings of the disclosure may be especially advantageous are those superalloys having a high gamma prime (γ') value. "Gamma prime" (γ') is the primary strengthening phase in nickel-based alloys. Example high gamma prime superalloys include but are not limited to: Rene 108, N5, GTD 444, MarM 247 and IN 738.

As indicated above, the disclosure provides a method of protecting hole(s) 162 in component 170 during a coating process. In particular, after a duration of use, component 170 may require repair or replacement of its outer coatings 180, 182, which may, for example, be worn or include spalls therein that may expose component 170 to the internal environment of turbomachine 100. As noted herein, if the holes 162 are blocked during the re-coating, it will result in a very significant negative impact on the effectiveness of the holes, e.g., as cooling holes, and the component. Further, if the holes are changed in size, it can also impact their effectiveness, e.g., as cooling holes. While the method may be described with used components 170, it may be employed with new or used components. It is especially applicable to used components 170 because the holes are already in place and configured as desired, and do not require or allow for changes through machining such as drilling in contrast to during the original fabrication of the component.

Figure 5:
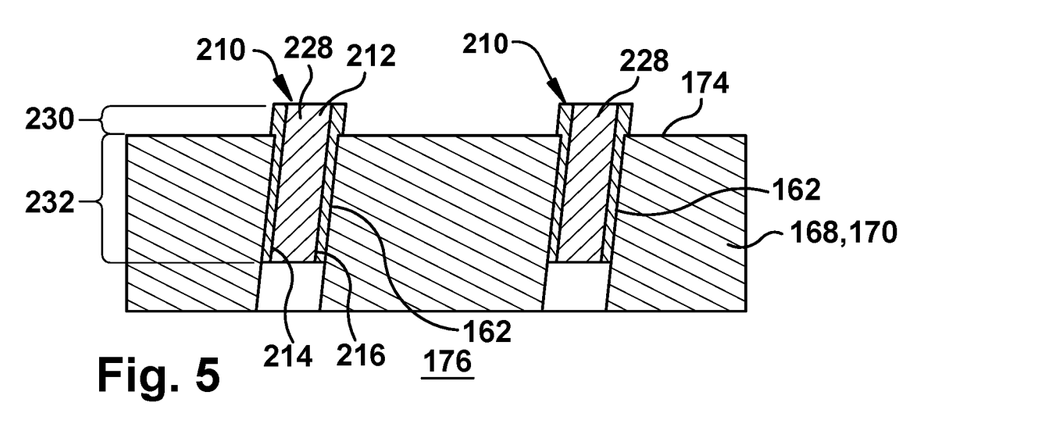
FIG. 5 shows a cross-sectional view of placing plugs in a pair of holes in the component from FIG. 4, according to embodiments of the disclosure.
Figure 7:
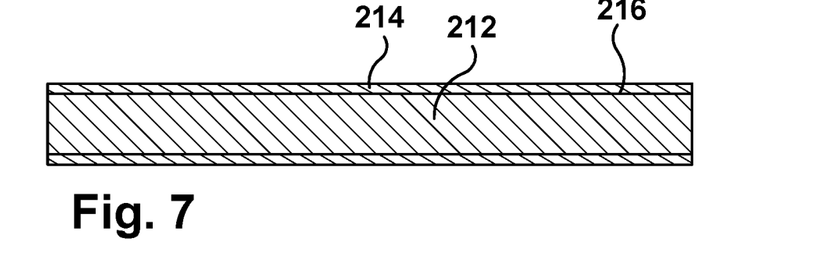
FIG. 7 shows a cross-sectional view of an extrusion for making the plug of FIG. 6, according to embodiments of the disclosure.
Figure 8:
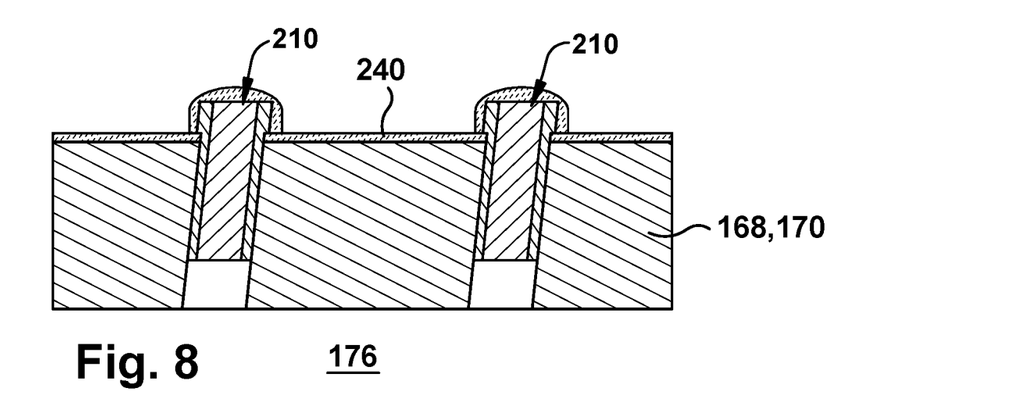
FIG. 8 shows a cross-sectional view of applying a coating over a pair of holes in a component with plugs, according to embodiments of the disclosure.
Figure 9:
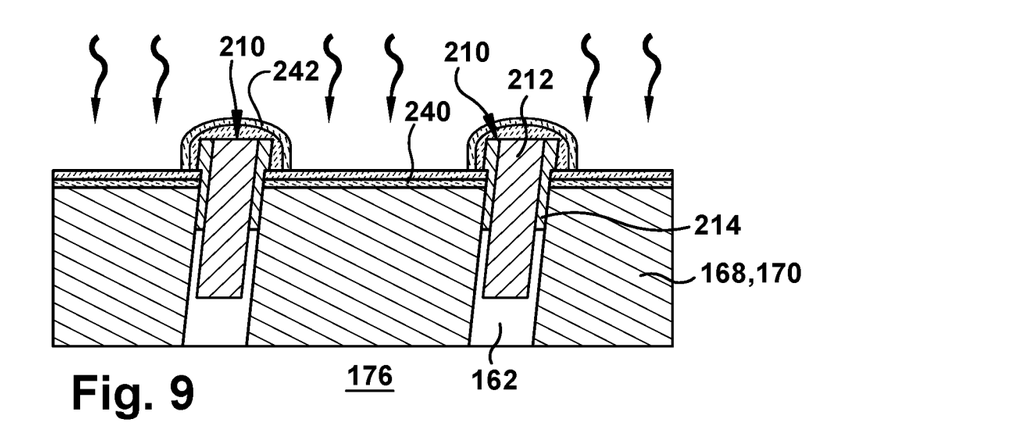
FIG. 9 shows a cross-sectional view of applying another coating over a pair of holes in a component with plugs, according to embodiments of the disclosure.

In accordance with embodiments of the disclosure, as shown in FIG. 5, plug(s) 200 is/are placed in one or more hole(s) 162 to protect the hole(s) during a coating process. FIG. 5 shows a cross-sectional view of pair of illustrative holes 162 in component 170 after any older coatings 180, 182 have been removed and outer surface 174 is otherwise prepped for re-coating, e.g., cleaned of residue, shaped as desired, etc. As shown in FIG. 5 and in a cross-sectional view of a single plug in FIG. 6, plugs 210 may include a water insoluble core 212 and a water soluble layer 214 surrounding at least a portion of an outer surface 216 of water insoluble core 212. As will be described, water soluble layer 214 engages an internal surface of hole 162 during the coating process Water soluble layer 214 can take a wide variety of forms. In one embodiment, water soluble layer 214 may include a water soluble ceramic. In one example, water soluble ceramic may include alumina, zircon, sodium hydrogen phosphate and sugar. In one particular embodiment, water soluble layer 214 may include any of the formulations described in U.S. Pat. No. 6,024,787, which is hereby incorporated by reference. For example, water soluble ceramic layer may include approximately 60-70% by weight alumina ($Al_2O_3$) powder, approximately 15-25% by weight zircon ($ZrSiO_4$) powder, approximately 5-15% by weight sodium hydrogen phosphate ($Na_2HPO_4$) and approximately 5% by weight sugar. A braze binder gel may be employed to assist in application of the layer to water insoluble core 212, but may be removed during a latter thermal process to remove moisture from plug 210. In another embodiment, water soluble layer 214 may include: polyethylene glycol, sodium chloride, mica powder and a plasticizer such as polyethylene and paraffin. Other formulations are also possible and considered within the scope of the disclosure. Water soluble layer 214 can surround an entire length of water insoluble core 212 (FIGS. 5-8), but may need only surround the core where hole 162 mates with water soluble layer 214. For example, FIG. 9 shows plugs 210 where only a portion of water insoluble core 212 is surrounded by water soluble layer 214, i.e., where holes 162 mate with the plug. As shown in a non-limiting example in FIG. 10, water soluble layer 214 may also surround an end 220 of water insoluble core 212.

Water insoluble core 212 may include any material that is not dissolvable in water, is sufficiently rigid and can withstand whatever environment may be expected during the coating process. In one embodiment, shown in FIG. 7, plug 210 may be formed in a similar fashion to a shielded metal arc welding (SMAW) electrode (also known as manual metal arc welding (MMA or MMA) or stick welding). As understood in the field, a SMAW electrode includes a metal core with flux surrounding the core. Plug 210 may be made by feeding the water soluble layer material in an extrusion press in a paste form, and passing water insoluble core 212 through a die, thus attaching water soluble layer 214 on water insoluble core 212. FIG. 7 shows a cross-sectional view of a length of a plug formed by this approach. After extrusion, the plug length can be exposed to a thermal process to remove moisture and sinter the materials together. Any desired length of plug 210 can be cut from the resulting extrusion, shown in FIG. 7. In any event, plug 210 includes an elongated body 218 (FIG. 6) that can have any length desired to accommodate holes 162. Where plugs 210 are formed in this manner, water insoluble core 212 may include a steel, a metal alloy and a superalloy.

In another embodiment, plugs 210 may be formed by any method allowing for water soluble layer 214 to be adhered to water insoluble core 212, e.g., by spraying, molding, etc. In this case, water insoluble core 212 may include any sufficiently rigid material, e.g., an alloy steel, stainless steel, superalloy, etc., that can withstand whatever environment may be expected during the coating process. Here again, plug 210 can include an elongated body 218 (FIG. 6) that can have any length desired to accommodate holes 162.

Elongated body 218 of plug 210 and, in particular, an outer surface 219 of water soluble layer 214, can have any cross-sectional shape desired. Typically, plug 210 has a cross-sectional shape configured to mate with an internal cross-sectional shape of hole 162 at outer surface 174 of component 170. For example, plug 210 may be cylindrical shaped, i.e., rod-shaped with a circular cross-section, where a hole 162 is circular. Elongated body 218 of plug 210 may also have any other shape to ensure mating with holes 162 and/or allow for the desired coating formation thereon. The tolerances may be to any level desired, e.g., slip fit, interference fit, etc. Water insoluble core 212 and water soluble layer 214 may have the same cross-sectional shape or they may be different. Further, the thickness of water soluble layer 214 can be user selected. For example, water insoluble core 212 occupy anywhere from approximately 35-95% of a cross-sectional area of plug 210, with water soluble layer 214 consuming the rest of the cross-sectional area.

Figure 6:
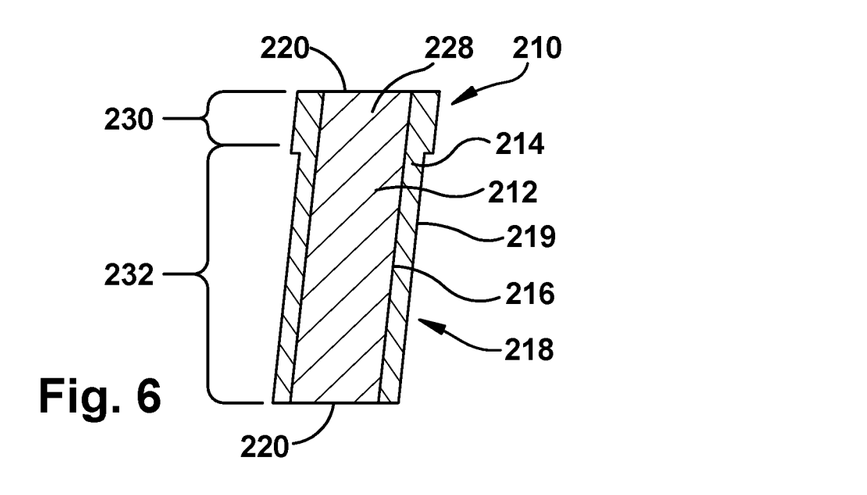
FIG. 6 shows a cross-sectional view of a plug including a water insoluble core and a water soluble layer thereon, according to embodiments of the disclosure.

As shown in FIG. 6, elongated body 218 may be tapered at at least one end 220 thereof. That is, a surface of end 220 of elongated body 218 is non-perpendicular to an outer surface 222 thereof. Other shapes are also possible such as but not limited to: a pointed end, a rounded end, a bullet-shaped end, etc. Different shapes of the end 220 may be desired to aid in plug 210 insertion, removal, or control of coating(s) 240, 242 (FIGS. 8 and 9) during application, e.g., flow direction, thickness, etc.

Referring to FIGS. 5 and 6, placing plug 210 in hole 162 may include placing the plug such that an end 228 of water insoluble core 212 extends out of hole 162 a larger distance than a thickness of coating(s) 240, 242 (FIGS. 8 and 9), to be applied thereto. In order to provide this function, water soluble layer 214 may include a first portion 230 configured to mate with hole 162, and a second portion 232 having a larger dimension than hole 162 for abutting outer surface 174 of component 170. In this fashion, a portion of plug 210 relative to hole 162 can be inserted, and end 228 of water insoluble core 212 can extend out of hole 162 a larger distance than a thickness of coating(s) 240, 242 (FIGS. 8 and 9) after the coating(s) are applied (FIGS. 8-9). Also, since a depth of plug 210 into hole 162 is controlled, a situation in which the plug cannot be removed can be avoided. Here, second portion 232 is dimensioned to position water insoluble core 212 to allow for removal thereof after use. Second portion 232 can be formed by removing material, e.g., by etching or machining, or second portion 232 can be formed by adding material to elongated body 218, e.g., by coating or otherwise adding material. Water soluble layer 214 engages an internal surface of hole 162, i.e., during the coating process Turning to FIGS. 8 and 9, in a next step of the method, a coating is applied over plug 210 and at least a portion of component 170. In the example, two coatings 240, 242 are applied, but this is not necessary in all instances. In the non-limiting example shown in FIG. 8, this process includes applying a bond coating 240. Bond coating 240 may include any now known or later developed bond coat material such as but not limited to: nickel or platinum aluminides, nickel chromium aluminum yttrium (NiCrAlY) or nickel cobalt chromium aluminum yttrium (NiCoCrAlY). In the non-limiting example shown in FIG. 9, this process may also or alternatively include applying a thermal barrier coating (TBC) 242. TBC 242 may include any now known or later developed TBC material such as but not limited to: yttria-stabilized zirconia (YSZ), mullite and alumina. TBC 242 may include additional layers also such as a thermally grown oxide. As shown in FIG. 9, this process may also include heat treating bond coating 240 and TBC 242, e.g., approximately 600° C., for a specified duration, to bond the coatings to outer surface 174 of component 170. Each of water insoluble core 212 and water soluble layer 214 must be configured to withstand this heat treatment.

Figure 10:
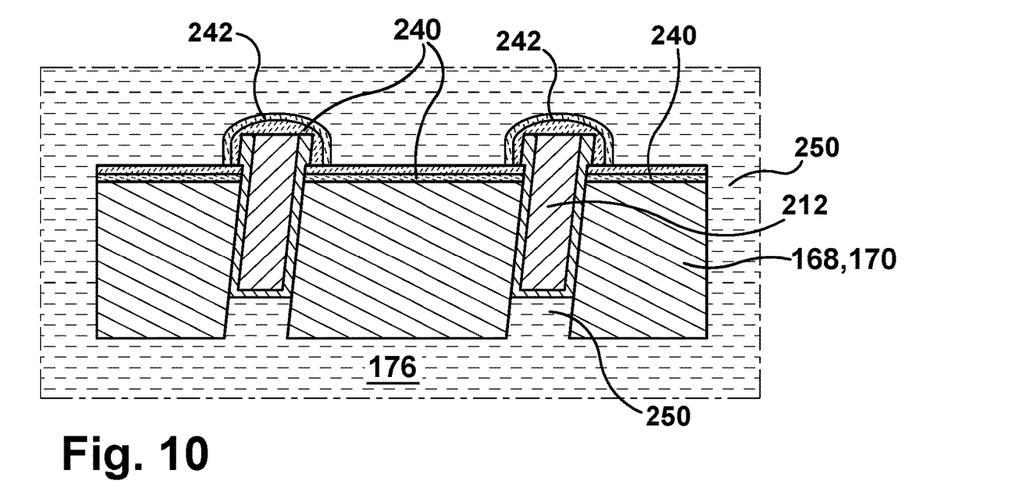
FIG. 10 shows a cross-sectional view of immersing the component in water to dissolve a water soluble layer on the plugs, according to embodiments of the disclosure.
Figure 11:
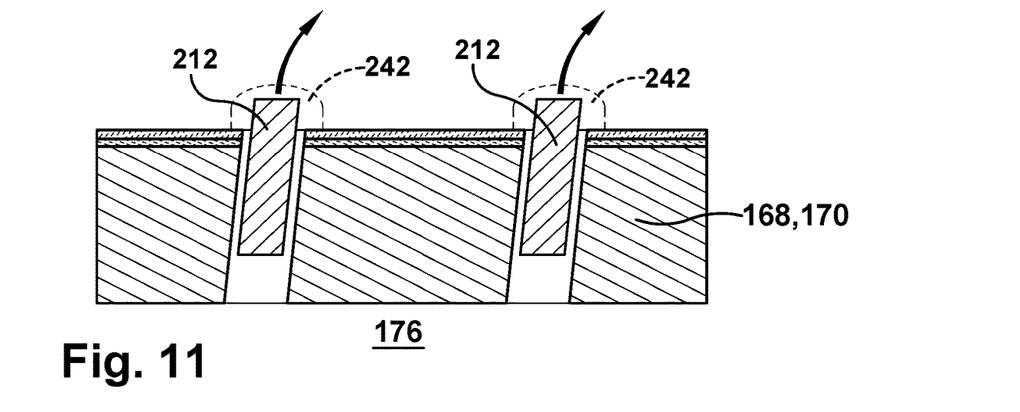
FIG. 11 shows a cross-sectional view of removing the water insoluble cores from a pair of holes in a component, according to embodiments of the disclosure.

As shown in FIG. 10, once coated, component 170 is immersed in water 250 to dissolve water soluble layer 214, allowing for removal of water insoluble core 212 (see FIG. 11). Water soluble layer 214 may be exposed to water 250 via the water entering from cooling chamber 176. Water 250 may be circulated to assist in the dissolving of water soluble layer 214. The duration of the immersion, i.e., period of time, necessary to dissolve water soluble layer 214 may be dependent on, for example, the thickness of water soluble layer 214, the material of water soluble layer 214, the flow rate of the water, etc.

As shown in FIG. 11, once water soluble layer 214 is dissolved, water insoluble core 212 sits loosely in hole 162. That is, water soluble layer 214 no longer engages internal surface of hole 162. FIG. 11 shows removal of coating(s) 240, 242 from over hole 162, e.g., by any known method, and removal of water insoluble core 212 from within hole 162. Since second portion 232 (FIG. 6) of water soluble layer 214 positions end 228 of water insoluble core 212 such that it extends out of hole 162 a larger distance than thickness of coating(s) 240, 242, water insoluble core 212 can be easily removed, e.g., by hand, by inversion of the component, or by readily-available tools.

Figure 12:
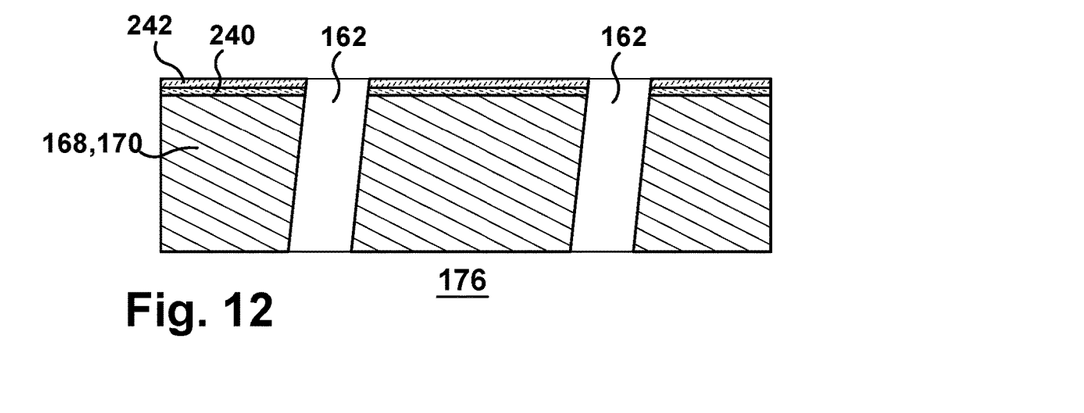
FIG. 12 shows a cross-sectional view of a component with a pair of holes and new coating(s) thereon, according to embodiments of the disclosure.

As shown in FIG. 12, plug 210 has ensured hole 162 is protected during the coating process, and hole 162 does not need to be re-worked in any manner. Holes 162 have retained their shape as originally designed, or as they were after use, and new coating(s) 240, 242 have been applied. Use of plugs 210 is quicker, simpler and less expensive than conventional masking approaches, and can be used in a variety of corrosive and/or oxidizing environments that may be observed in some coating processes.

The foregoing drawings show some of the processing associated according to several embodiments of this disclosure. In this regard, each drawing may represent a process associated with embodiments of the method described. It should also be noted that in some alternative implementations, the acts noted in the drawings may occur out of the order noted in the figure or, for example, may in fact be executed substantially concurrently or in the reverse order, depending upon the act involved. Also, one of ordinary skill in the art will recognize that additional steps may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A plug for retaining a hole in a component during a coating process, the plug comprising:
a water insoluble core; and
a water soluble layer surrounding at least a portion of an outer surface of the water insoluble core, the water soluble layer engaging an internal surface of the hole during the coating process.

2. The plug of claim 1, wherein the water insoluble core includes one of a steel, a metal alloy or a superalloy.

3. The plug of claim 1, wherein the water soluble layer includes one of: a) alumina, zircon, sodium hydrogen phosphate and sugar; or b) polyethylene glycol, sodium chloride, mica powder and a plasticizer.

4. The plug of claim 1, wherein the water insoluble core and the water soluble core form an elongated body.

5. The plug of claim 4, wherein the elongated body has a cylindrical shape.

6. The plug of claim 4, wherein the elongated body is tapered at at least one end thereof.

7. The plug of claim 1, wherein the water soluble layer includes a first portion configured to mate with the hole, and a second portion having a larger dimension than the hole for abutting an outer surface of the component.

8. The plug of claim 1, wherein the water insoluble core occupies approximately 35-95% of a cross-sectional area of the plug.

9. The plug of claim 1, wherein a cross-sectional shape of the plug is configured to mate with an internal cross-sectional shape of the hole at an outer surface of the component.

10. A method of protecting a hole in a component during a coating process, the method comprising:
placing a plug in the hole, the plug including a water insoluble core and a water soluble layer surrounding at least a portion of an outer surface of the water insoluble core;
applying a coating over the plug and at least a portion of the component;
immersing the component in water to dissolve the water soluble layer, allowing removal of the water insoluble core; and
removing the coating from over the hole and the water insoluble core from within the hole.

11. The method of claim 10, wherein the water insoluble core includes one of a steel, a metal alloy or a superalloy.

12. The method of claim 10, wherein the removing the coating from over the hole includes immersing the component with the plug therein in water for a period to dissolve the water soluble layer and allowing removal of the water insoluble core from within the hole.

13. The method of claim 10, wherein the water insoluble core and the water soluble core form an elongated body.

14. The method of claim 13, wherein the elongated body has a cylindrical shape.

15. The method of claim 13, wherein the elongated body is tapered at at least one end thereof.

16. The method of claim 10, wherein the water soluble layer includes a first portion configured to fit within the hole, and a second portion having a larger dimension than the hole for abutting an outer surface of the component.

17. The method of claim 10, wherein a cross-sectional shape of the plug is configured to mate with an internal cross-sectional shape of the hole at a surface of the component.

18. The method of claim 10, wherein the water insoluble core occupies approximately 35-95% of a cross-sectional area of the plug.

19. The method of claim 10, wherein the placing a plug in the hole includes placing the plug such that an end of the water insoluble core extends out of the hole a larger distance than a thickness of the coating.

20. The method of claim 10, wherein the applying the coating over the plug and at least the portion of the component includes:
applying a bond coating;
applying a thermal barrier coating (TBC) over the bond coating; and
heat treating the bond coating and the TBC.

* * * * *